United States Patent [19]

Tanaka

[11] Patent Number: 5,459,523
[45] Date of Patent: Oct. 17, 1995

[54] IMAGE TRANSMISSION DEVICE

[75] Inventor: Yasuyuki Tanaka, Tokyo, Japan

[73] Assignee: Canon Kabushiki Kaisha, Tokyo, Japan

[21] Appl. No.: 136,722

[22] Filed: Oct. 13, 1993

Related U.S. Application Data

[63] Continuation of Ser. No. 908,445, Jun. 30, 1992, which is a continuation of Ser. No. 483,120, Feb. 22, 1990, abandoned.

[30]     Foreign Application Priority Data

Feb. 27, 1989 [JP]  Japan .................................... 1-043285

[51] Int. Cl.$^6$ .................................................. H04N 11/08
[52] U.S. Cl. .......................................... 348/488; 348/427
[58] Field of Search .................... 358/141, 133, 358/142, 138, 181, 11, 12, 14, 15; H04N 7/04, 7/08

[56]            References Cited

U.S. PATENT DOCUMENTS

| | | | |
|---|---|---|---|
| 4,533,936 | 8/1985 | Tiemann et al. | 358/12 |
| 4,631,720 | 12/1986 | Koeck | 370/84 |
| 4,646,135 | 2/1987 | Eichelberger et al. | 358/142 X |
| 4,764,805 | 8/1988 | Rabbani et al. | 358/133 |
| 4,782,387 | 11/1988 | Sabri et al. | 358/138 X |
| 4,807,030 | 2/1989 | Sacks | 358/133 X |
| 4,858,004 | 8/1989 | Kitagaki et al. | 358/133 |
| 4,864,562 | 9/1989 | Murakami et al. | 370/84 |
| 4,873,684 | 10/1989 | Kobayashi et al. | 370/102 |
| 4,918,523 | 4/1990 | Simon et al. | 358/133 |

*Primary Examiner*—Victor R. Kostak
*Attorney, Agent, or Firm*—Robin, Blecker, Daley & Driscoll

[57]            ABSTRACT

An image transmission device is arranged to compress an image signal having a predetermined signal band by using a band compression circuit and to transmit the compressed image signal. The image transmission device is characterized by synthesizing a plurality of other image signals having a signal band narrower than that of the aforesaid image signal to approximately adapt the signal band of the other image signals to that of the aforesaid image signal and by selectively supplying one of the synthesized other image signals and the aforesaid image signal to the band compression circuit.

35 Claims, 9 Drawing Sheets

IMAGE TRANSMISSION DEVICE

This is a continuation application under 37 CFR 1.62 of prior application Ser. No. 908,445, filed Jun. 30, 1992 which is a continuation of Ser. No. 483,120 filed Feb. 22, 1990 (now abandoned).

BACKGROUND OF THE INVENTION

1. Field of the Invention

The present invention relates to an image transmission device for storing and/or transmitting an image in band-compressed form.

2. Description of the Related Art

An NTSC signal format (having a signal band of approximately 4.2 MHz), based on so-called NTSC (National Television System Committee) standards, has conventionally been used as one signal format for transmitting a multilevel color motion image. In recent years, high-quality television standards such as the high-definition television standards (corresponding to a signal band (video band) of approximately 20 MHz) have been proposed in order to record and reproduce high-fineness, high-resolution images with improved presence.

However, because of the high degree of definition, such a high-definition television signal format must accommodate information the amount of which is several times larger than that of the conventional signal format. Accordingly, if a signal according to the high-definition television signal format is to be stored or transmitted with no original amount of information reduced, it is necessary to prepare an enormously wide storage area or transmission band, and this may impair time, cost or memory savings. Accordingly, it is common practice to store or transmit such a high-definition television signal by means of "band compression", that is, the technique of reducing the amount of information by utilizing either the redundancy of an image or the visual characteristics of human beings. Offset sub-sampling is a representative band-compression technique. In the Off-set sub-sampling, points which are offset as shown in FIGS. 7(B) and 7(C) are alternately sampled as representative values for each frame from an original image signal produced by the ½ interlaced scanning as shown in, for example, FIG. 7(A). Then, the sampled values are stored or transmitted as required. In this manner, in the original image signal, odd sample points (o11, o13, ... o21, o23, ...) along odd scanning lines and even sample points e12, e14, ... e22, e24, ...) along even scanning lines are extracted for transmission, whereby the amount of information can be reduced to ½. If a still image is to be reproduced, all the pixels contained in continuous four fields are used to effect inter-field interpolation of the sample points omitted for the transmission. If a motion image is to be reproduced, the pixels in one field only are used to effect inter-line interpolation. By adaptively reproducing the sample points in accordance with variation in motion, it is possible to minimize the deterioration of image quality by utilizing the visual characteristics of human beings.

FIG. 6(A) shows the conventional construction of the encoder used in a typical off-set sub-sampling apparatus.

In the illustrated encoder, an TCI (time compressed integration) encoder 14 is provided with input terminals 11, 12 and 13. A luminance signal Y, a color-difference signal Pr, and a color-difference signal Pb are supplied as a high-definition television image signal to the input terminals 11, 12 and 13, respectively.

The TCI encoder 14 selects the color-difference signals Pr and Pb in alternation every scanning line, applies ¼ time-compression to the selected signal, and multiplexes it with the luminance signal in a vertical blanking period thereof.

The output from the TCI encoder 14 is input to an inter-field prefilter 15, an intra-field prefilter 16 and a motion vector detecting circuit 17. The inter-field prefilter 15 is a still image area filter utilizing a field memory, and its output is supplied to a mixer 19. The intra-field prefilter 16 is an intra-field two-dimensional filter utilizing a line memory, and the output having passed through a motion image area filter is supplied to the mixer 19 and a motion detecting circuit 18. The motion vector detecting circuit 17 detects one motion vector representative of the whole image and supplies it to a multiplexing circuit 21 as a motion vector signal, thereby preventing the whole image from becoming a blurred moving image area during panning or tilting.

The motion detecting circuit 18 detects the amount of motion on the basis of variation in the luminance (shading) of a pixel of interest, and then adaptively weights the output of the inter-field prefilter 15 and that of the intra-field prefilter 16. The outputs of the respective filters 15 and 16 are mixed in the mixer 19 in accordance with the above weighting. The mixer 19 supplies to a sub-sampling circuit 20 the output mixed at a predetermined ratio. The sub-sampling circuit 20 samples pixels as shown in FIGS. 7(B) and 7(C) and supplies the sampled pixels to the multiplexing circuit 21. The multiplexing circuit 21 provides to an output terminal 22 a multiplexed signal in which the image signal and the motion vector signal are multiplexed with other signals such as audio signals (not shown).

FIG. 6 (B) shows the conventional construction of the decoder used in the off-set sub-sampling apparatus.

The multiplexed signal output from the aforesaid encoder is input to a demultiplexing circuit 24 through a transmission path and the input terminal 23 of the decoder.

The demultiplexing circuit 24 separates the multiplexed signal output from the encoder into the image signals, the motion vector signal, the audio signal (not shown) and the like. The demultiplexing circuit 24 supplies the image signal separated from the aforesaid multiplexed signal to an inter-field interpolation circuit 25, an intra-field interpolation circuit 26 and a motion detecting circuit 27, the motion vector signal to the inter-field interpolation circuit 25, and the audio signal or the like to an audio circuit (not shown).

The inter-field interpolation circuit 25 includes a frame memory and effects inter-field interpolation of a still image area and a process (motion-vector correction) for maintaining the still image area during panning or the like by shifting a readout position in a frame memory. The result is output to a mixer 28. The intra-field interpolation circuit 26 effects line interpolation within a field for the sake of the motion image area and supplies the output to the mixer 28. The motion detecting circuit 27 detects the amount of motion of the pixel of interest and supplies the detected amount of motion to the mixer 28. The mixer 28 mixes the output of the inter-field interpolation circuit 25 and that of the intra-field interpolation circuit 26 at a proportion corresponding to the amount of motion detected by the motion detecting circuit 27, and supplies the mixed output to a TCI decoder 29. The TCI decoder 29 separates the input into the TCI luminance signal Y, the color-difference signal Pr and the color-difference signal Pb, and provides the luminance signal Y, the color-difference signal Pr and the color-difference signal Pb to an output terminal 30, an output terminal 31 and an output terminal 32, respectively.

However, even if the conventional off-set sub-sampling apparatus described above is used for effecting band compression to store or transmit a high-definition television signal, it is still necessary to use a storage area or a transmission band which is several times greater than that required to handle conventional television signals such as NTSC signals. Accordingly, if the future widespread use of high-definition television sets is taken into account, it will be understood that it is costly for individual users to prepare VTRs, image transmission devices or transmission paths as exclusively used for for high-definition television signals.

SUMMARY OF THE INVENTION

It is, therefore, an object of the present invention to provide an image transmission device which is selectively applicable to storage or transmission of a high-definition television signal or storage or transmission of television signals based on a plurality of NTSC formats or the like.

To achieve the above object, in one specific embodiment of the present invention, there is provided an image transmission device for compressing an image signal having a predetermined signal band by using band-compression means and for transmitting the compressed image signal. The image transmission device is characterized by synthesizing a plurality of other image signals having a signal band narrower than that of the aforesaid image signal to thereby approximately adapt the synthesized image signals to the signal band of the aforesaid image signal and by selectively supplying the synthesized image signals or the aforesaid image signal to the band compression means.

The above arrangement makes it possible to adapt a transmission system for a particular format of image signal to another form of image signal.

Further objects, features and advantages of the present invention will become apparent from the following detailed description of embodiments of the present invention with reference to the accompanying drawings.

DETAILED DESCRIPTION OF THE PREFERRED EMBODIMENT

Preferred embodiments of the present invention will be described in detail below with reference to the accompanying drawings.

Figure 1A:
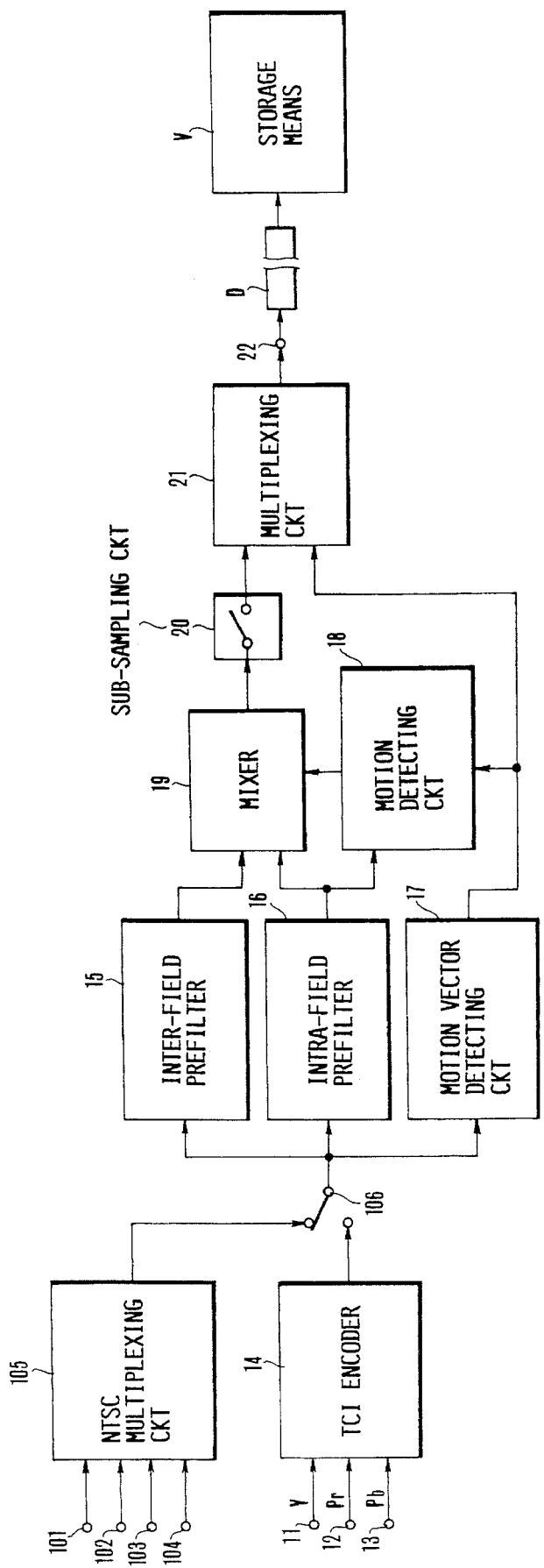
FIGS. 1(A) and 1(B) are block diagrams showing one embodiment of the present invention.
Figure 1B:
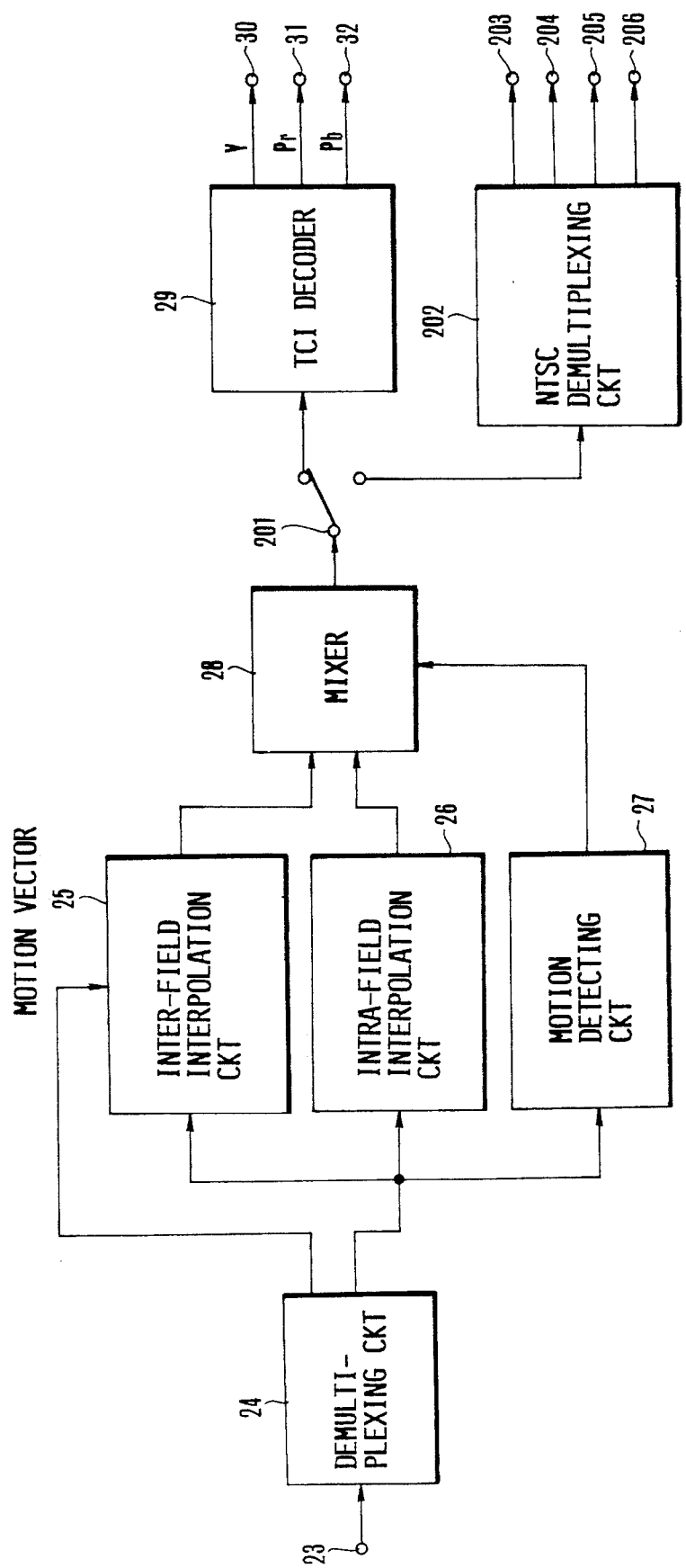

FIG. 1(A) is a block diagram showing the construction of an encoder according to a first embodiment of the present invention, while FIG. 1(B) is a block diagram showing the construction of a decoder according to the same embodiment. In each of FIGS. 1(A) and 1(B), similar reference numerals are used to denote elements corresponding to those used in the conventional arrangement shown in FIGS. 6(A) and 6(B).

Figure 6A:
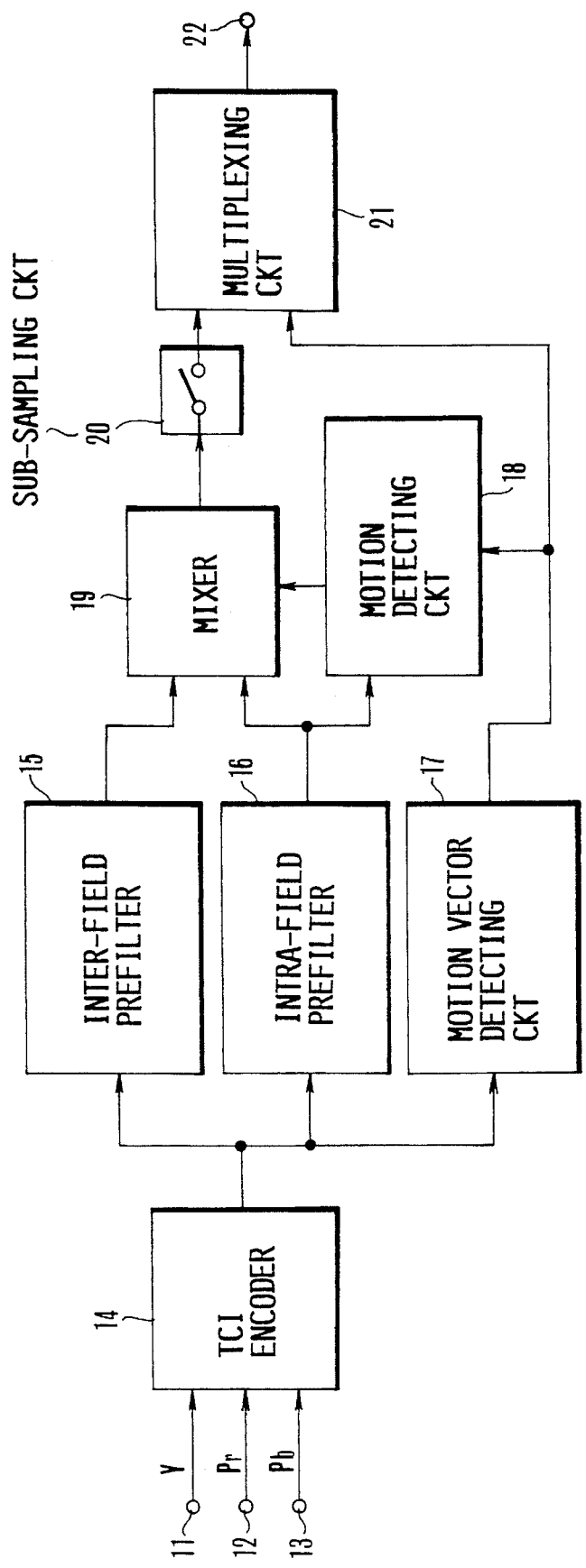
FIGS. 6(A) and 6(B) are block diagrams showing an encoder and a decoder of the conventional type, respectively.
Figure 6B:
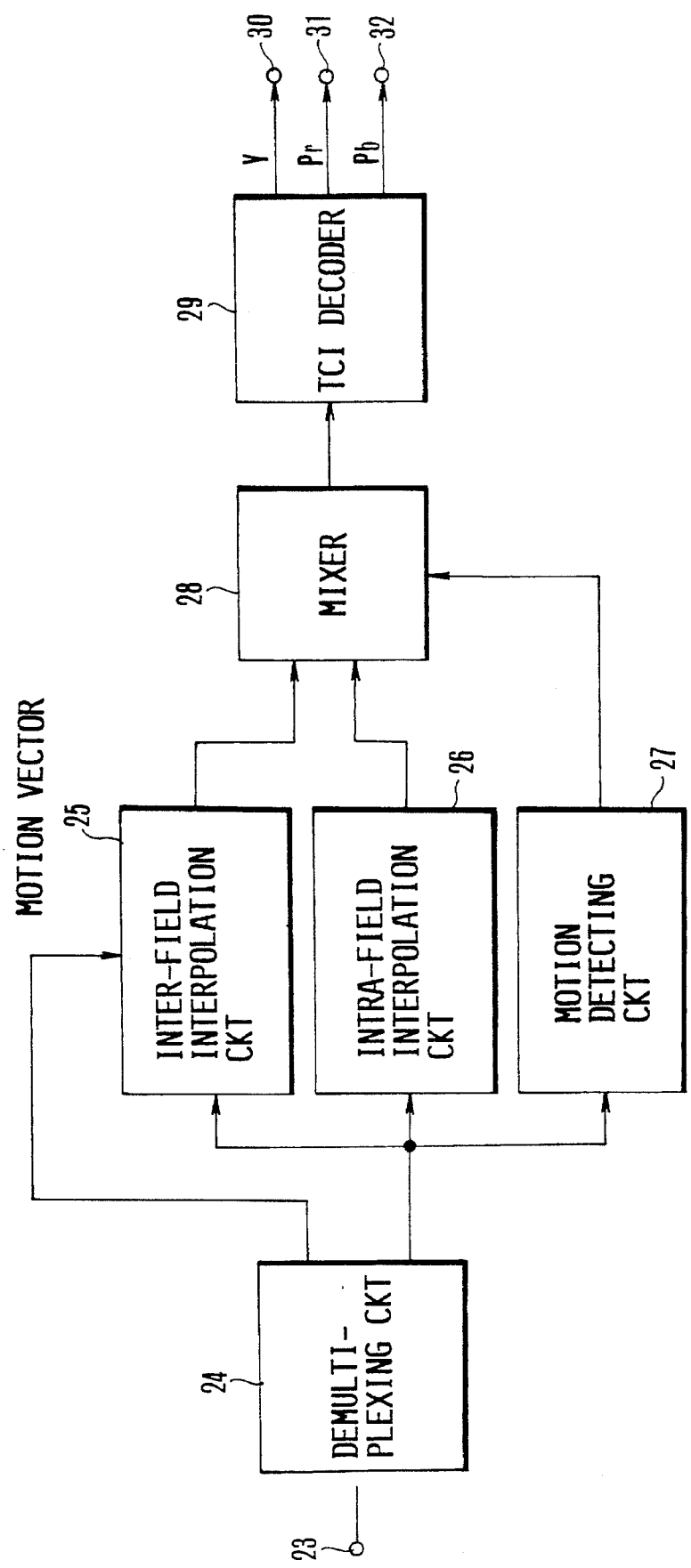
Figure 7A:
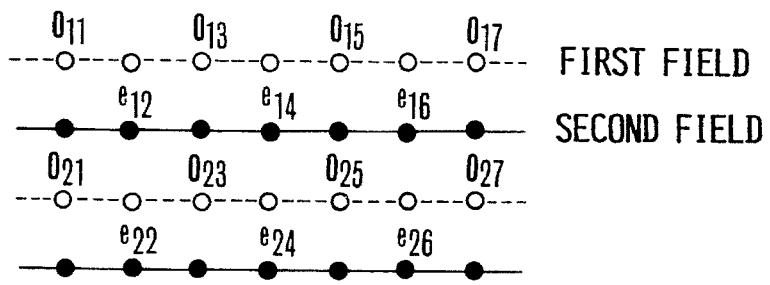
FIGS. 7(A), 7(B) and 7(C) are views which serve to illustrate off-set sub-sampling.
Figure 7B:
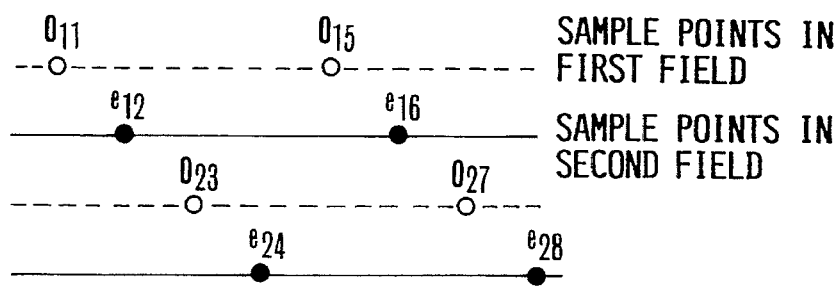
Figure 7C:
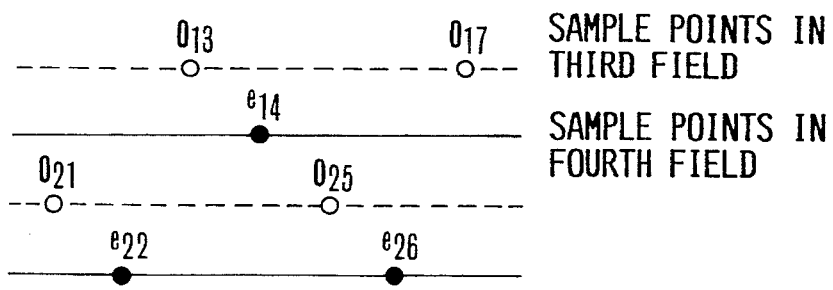

Referring first to FIG. 1(A), the illustrated encoder differs from the conventional encoder of FIG. 6(A) in that an NTSC multiplexing circuit 105 and a selector switch 106 are newly added. The selector switch 106 is arranged to select either the NTSC multiplexing circuit 105 or the TCI encoder 14 and electrically connect the selected element to filters 15, 16 and a motion vector detecting circuit 17.

Referring to FIG. 1(B), the illustrated decoder differs from the conventional decoder of FIG. 6 (B) in that an NTSC demultiplexing circuit 105 and a selector switch 201 are newly added. The selector switch 201 is arranged to select either the NTSC demultiplexing circuit 202 or the TCI decoder 29 and electrically connect the selected element to a mixer 28.

Figure 2:
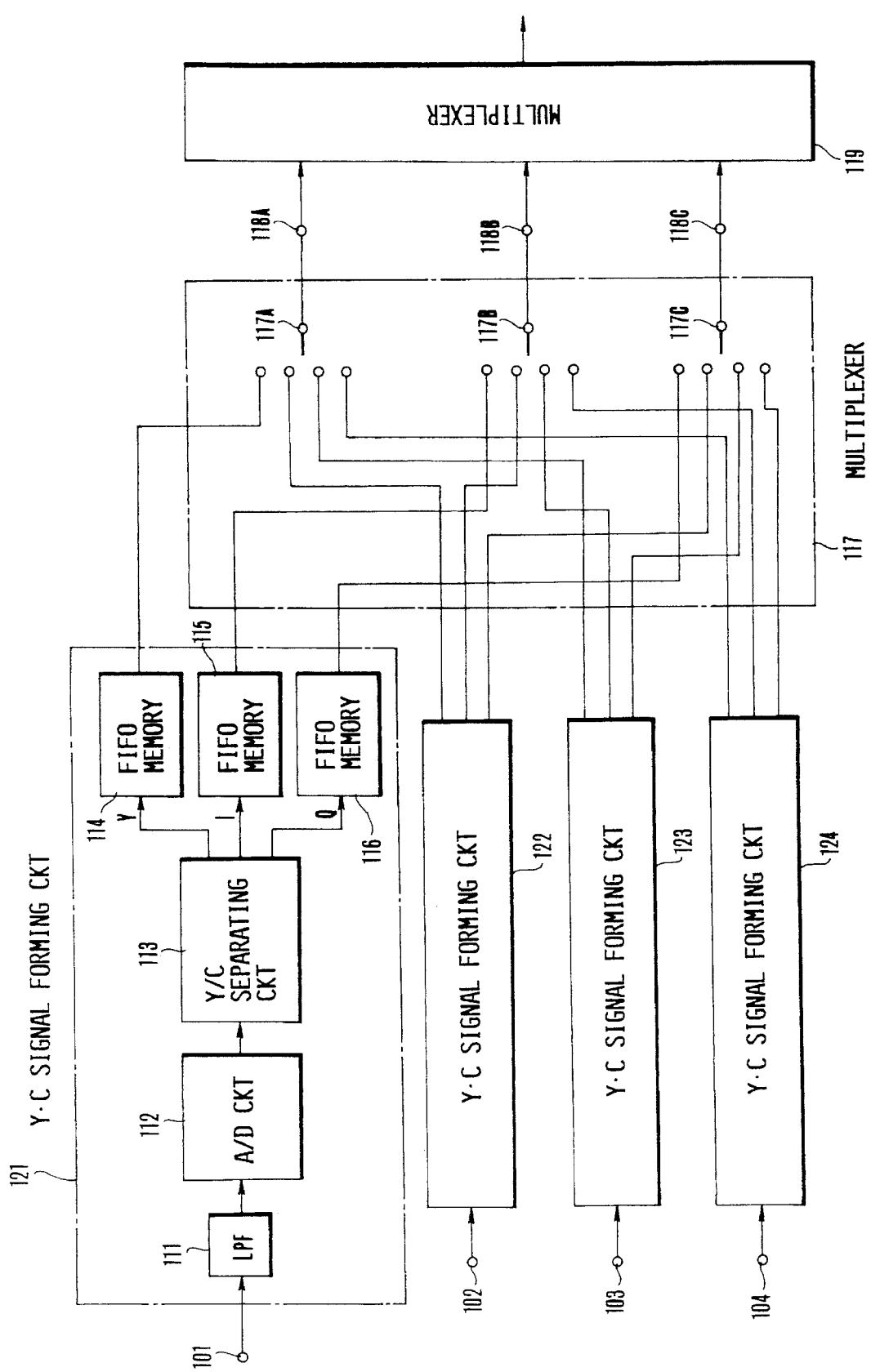
FIG. 2 is a block diagram showing the NTSC multiplexing circuit used in the embodiment of the present invention.

FIG. 2 is a block diagram showing the NTSC multiplexing circuit 105 for the purpose of illustration. In the illustrated arrangement, NTSC signals are respectively supplied to input terminals 101–104 over four different channels which extend from a plurality of video tape recorders (VTRs) or tuners (not shown). Specifically, a first image NTSC signal is supplied to the input terminal 101, a second image NTSC signal to the input terminal 102, a third image NTSC signal to the input terminal 103, and a fourth image NTSC signal to the input terminal 104. The input terminals 101–104 are connected to corresponding circuits 121–124 for forming Y and C signals (hereinafter referred to as "Y·C signal forming circuits"). Since all the Y·C signal forming circuits 121–124 have the same circuit arrangement, the following explanation refers to the Y·C signal forming circuit 121 corresponding to the first image NTSC signal. The first image NTSC signal input to the input terminal 101 is band-limited by a low-pass filter (LPF) 111, and the result is input to an A/D circuit 112 for analog-to-digital conversion. The A/D circuit 112 samples the NTSC signal at 3 fsc (fsc: color subcarrier frequency) and supplies the sampled signal to the Y/C separating circuit 113.

The Y/C separating circuit 113 separates the NTSC signal thus processed into a luminance signal Y, a color-difference signal I and a color-difference signal Q. The Y/C separating circuit 113 partially omits the separated luminance signal Y and supplies the result to an FIFO (first-in/first-out) memory 114 having a storage capacity of one field based on the NTSC standards. Similarly, the Y/C separating circuit 113 partially omits the color-difference signal I by ¼ sampling, further reduces it by 50% of the entire line numbers, and supplies the result to an FIFO memory 115 having a storage capacity of one-eighth field based on the NTSC standards. Also, the Y/C separating circuit 113 partially omits the color-difference signal Q by ¼ sampling, further reduces it by 50% of the entire line numbers, and supplies the result to an FIFO memory 116 having a storage capacity of one-eighth field based on the NTSC standards. The outputs from the FIFO memories 114, 115 and 116 are supplied to the contacts of the selector switches 117A, 117B and 117C of a multiplexer 117 The second, third and fourth image NTSC signals, input to the respective input terminals 102, 103 and 104, are respectively processed by the Y·C signal forming circuits 122, 123 and 124 as in the case of the first image NTSC signal. The results are output to the corresponding contacts of the selector switches 117A, 117B and 117C of the multiplexer 117.

Figure 4:
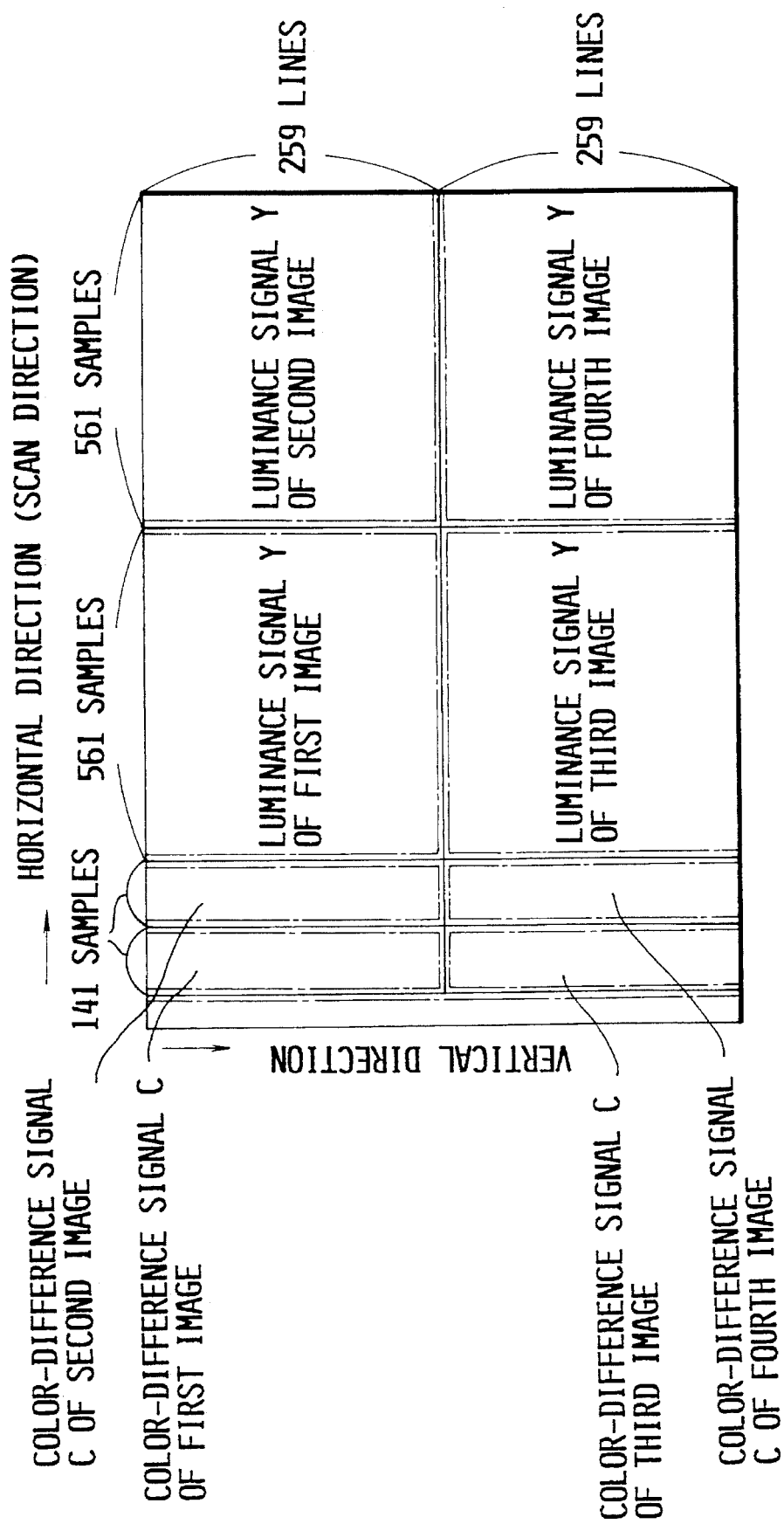
FIG. 4 is a view showing the pixel arrangement for one field of the NTSC image signal output from the NTSC multiplexing circuit used in the embodiment.
Figure 5:
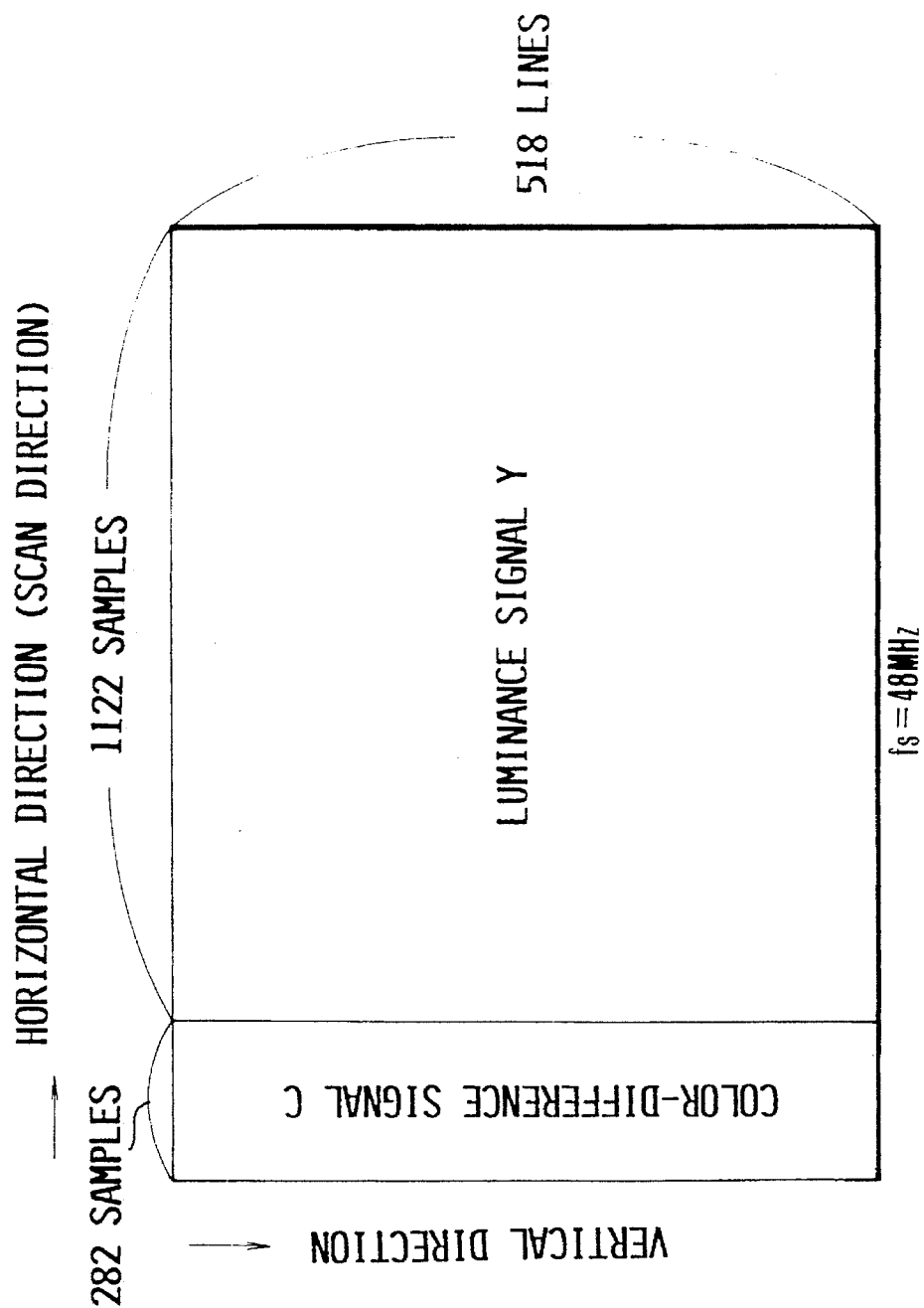
FIG. 5 is a view showing the pixel arrangement for one field of the high-definition television image signal output from the TCI encoder used in the embodiment.

The multiplexer 117 reads out the image data stored in the FIFO memories 114, 115 and 116 of the aforesaid Y·C signal forming circuits 121–124, in sequence and at predetermined intervals by means of the selector switches 117A, 117B and 117C, and supplies the readout image data to output terminals 118A, 118B and 118C, respectively. In this matter, the NTSC signals of the respective four channels are subjected to time-division multiplexing. The outputs at the outputs terminals 118A, 118B and 118C are then supplied to another multiplexer 119 for the purpose of time-division multiplexing. The multiplexed signal output from the multiplexer 119 carries a pixel arrangement such as that shown in FIG. 4. The pixel arrangement of FIG. 4, corresponding to the first to fourth image NTSC signals, approximately coincides with the pixel arrangement of the high-definition television signal of FIG. 5 as viewed from the pixel arrangement of the color-difference signal C consisting of the color-difference signals I and Q and the luminance signal Y relative to a horizontal synchronizing signal HD. Accordingly, in the encoder of the above embodiment shown in FIG. 1(A), the image data carried by the first to fourth image NTSC signals, which are output from the NTSC multiplexing circuit 105 through the aforesaid multiplexer 119 to the contact of the selector switch 106 corresponding to the NTSC multiplexing circuit 105, is approximately identical to the high-definition image data provided at the contact of the selector switch 106 corresponding to the TCI encoder 14. Also, the signal bands (about 8 MHz) of both image data are approximately equal to each other. In addition, the selector switch 106 makes it possible to selectively switch the arrangement in which the encoder of the above embodiment processes a high-definition television signal and the arrangement in which the encoder processes an NTSC signal. In the above embodiment, a blank for at least one pixel is inserted between adjacent signal portions, as shown by dot-dashed line in FIG. 4, thereby preventing interference between the adjacent signals. The selective switching of the selector switch 106 may be effected manually or automatically, depending upon the use of the above embodiment, and display of the selectively switched state may be provided at the decoder. The decoder determines whether the current signal is a high-definition television signal or an NTSC signal in accordance with the contents of the image data displayed by or received from the encoder, and allows selective switching of the selector switch 201 to be effected manually or automatically, as required.

In the present embodiment, as described above, either the high-definition television signal compressed to a band of approximately 8 MHz and provided to the output terminal 22 or the NTSC signals for the four channels subjected to time-division multiplexing, are fed to the succeeding signal processing step over one transmission path D. The image signal thus processed is supplied to a recording means V, such as a VTR capable of recording wide-band signals, for recording purposes.

Figure 3:
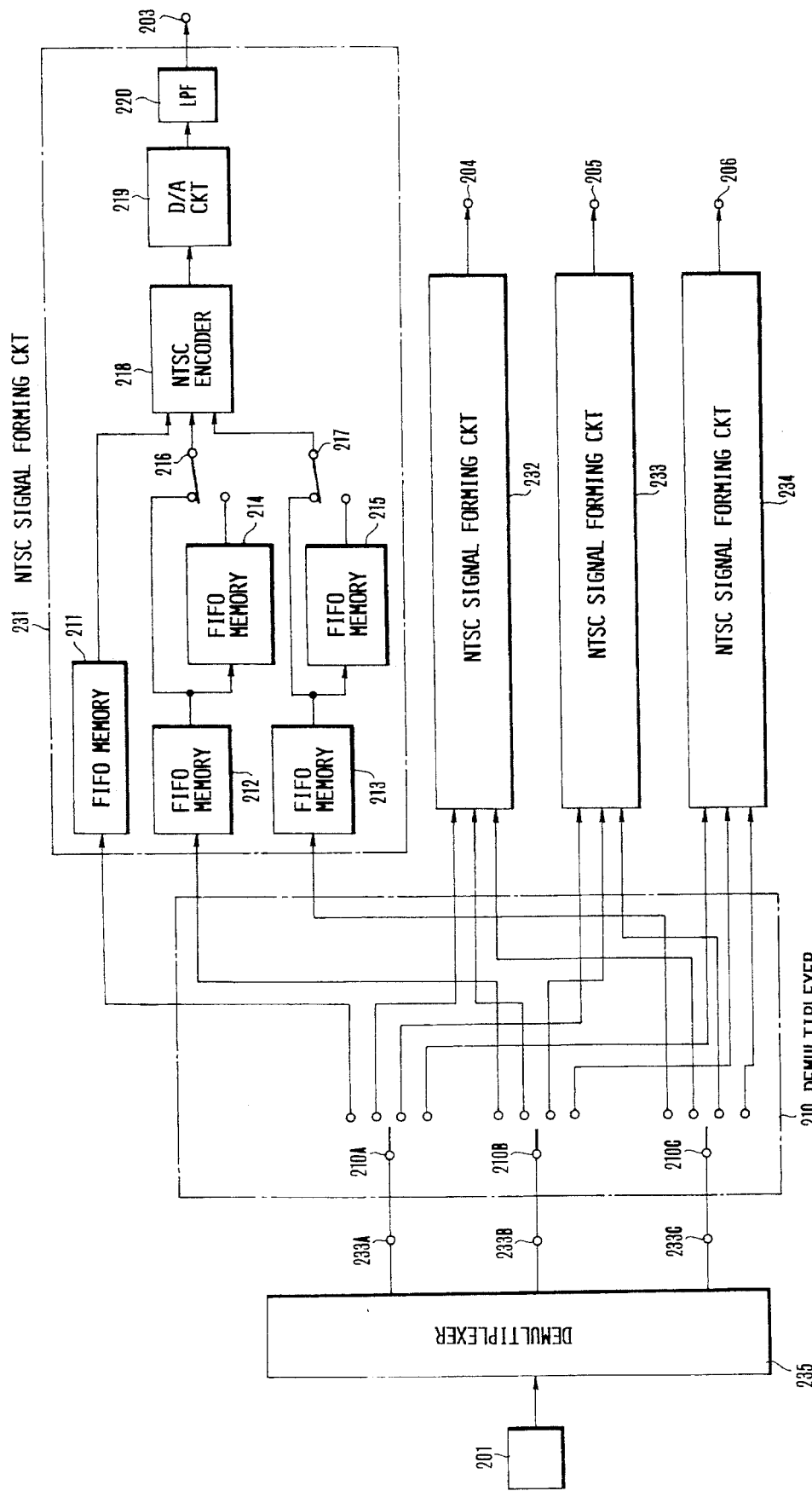
FIG. 3 is a block diagram showing the NTSC demultiplexing circuit used in the embodiment of the present invention.

FIG. 3 is a block diagram showing the NTSC demultiplexing circuit 202 provided in the decoder. In the illustrated arrangement, the NTSC multiplexed signal is supplied from the mixer 28 shown in FIG. 1(B) through the selector switch 201 to the NTSC demultiplexing circuit 202, which in turn separates the received NTSC multiplexed signal into the color-difference signals I, Q and the luminance signal Y. The respective separated signals are supplied to the input terminals 233A, 233B and 233C of another demultiplexer 210. The aforesaid NTSC image signals supplied to the input terminals 233A, 233B and 233C are demultiplexed by switching contacts 210A, 210B and 210C at predetermined timings in the demultiplexer 210. The first image NTSC signal is supplied to an NTSC signal forming circuit 231, and the second, third and fourth image NTSC signals are supplied to NTSC signal forming circuits 232, 233 and 234, respectively. Since all the NTSC signal forming circuits 231–234 have the same circuit arrangement, the following explanation refers to the NTSC signal forming circuit 231 corresponding to the first image NTSC signal. The luminance signal Y of the first image NTSC signal is supplied to an FIFO memory 211 having a storage capacity of one field based on the NTSC standards via the selector contact 210A of the demultiplexer 210. The color-difference signal I is supplied to an FIFO memory 212 having a storage capacity of one-eighth field based on the NTSC standards via the selector contact 210B. Similarly, the color-difference signal Q is supplied to an FIFO memory 213 having a storage capacity of one-eighth field based on the NTSC standards via the selector contact 210C. In the illustrated arrangement, the luminance signal Y input to the FIFO memory 211 is directly read into an NTSC encoder 218 at predetermined timings. The color-difference signal I supplied to the FIFO memory 212 is omitted every other line. Accordingly, for the purpose of interpolation, the color-difference signal I is interpolated every other line by a line interpolating FIFO memory 214 capable of storing one line of color-difference signal (one-quarter line of luminance signal) and a selector switch 216 arranged to switch at predetermined timings. The interpolated signal is then supplied to the NTSC encoder 218. Similarly, the color-difference signal Q supplied to the FIFO memory 213 is interpolated on a line basis by a line interpolating FIFO memory 215 and a selector switch 217, and the result is supplied to the NTSC encoder 218. The NTSC encoder 218 restores the input luminance signal Y, the color-difference signal I and the color-difference signal Q to the original NTSC signal, and supplies the restored signal to a D/A circuit 219 for digital-to-analog conversion. The first image NTSC signal, which has been converted to an analog signal by the D/A circuit 219, is provided to an output terminal 203 through a low-pass filter 220. Similarly, the second to fourth image NTSC signals are restored by the respective NTSC signal forming circuits 232–234, and the results are provided to corresponding output terminals 204–206.

As is apparent from the foregoing, in the image transmission system in which band compression is effected for storage or transmission of a single high-definition television signal, the transmitting apparatus is provided with the NTSC multiplexing circuit 105 and the selector switch 106 for selecting this circuit 105 or the encoder 14, while the receiving apparatus is provided with the NTSC demultiplexing circuit 202 and the selector switch 201 for selecting this circuit 202 or the decoder 29. Accordingly, transmission and reception of NTSC image signals for four channels can be accomplished.

In addition, the deterioration of image quality which might be experienced with panning in the NTSC system can be prevented in the following manner. One motion vector for each image carried by the four NTSC image signals explained with reference to the above embodiment, that is, a total of four motion vectors, are detected and transmitted for restoration on the receiving side. At the time of restoration on the receiving side, if an inter-field interpolation circuit 25 is used to interpolate each image by using the corresponding motion vector, it is possible to more effectively reduce the deterioration of the image quality.

The above embodiment has been explained on the assumption that the present device is intended to process high-definition television signals by utilizing NTSC image signals. However, the present invention is not limited to the combination of these signals. For instance, another form of high-definition television signal may be processed by utilizing image signals based on the PAL or SECAM system.

In the above embodiment, NTSC signals for four channels are multiplexed to form a signal having a band and a pixel arrangement similar to those of the high-definition television signal. If signals based on another standard are to be multiplexed, the number of signal channels may be five or more or one to three in relation to the required signal band. Alternatively, NTSC signals for one to three channels may, of course, be multiplexed.

As is apparent from the explanation of the presently preferred embodiment, the image transmission apparatus for high-definition television signals is provided with the means for selectively switching a high-definition television signal and another form of image signal such as an NTSC signal; and the means for processing the image signal in accordance with a particular kind of band processing, such as band compression, which is applied to the high-definition television signal. This arrangement enables the image transmission device for high-definition television signals to be selectively switched between different modes in accordance with various utilization environments, for example, between the mode of storing or transmitting high-definition television signals and the mode of storing or transmitting NTSC image signals or other image signals different from the high-definition television signals.

It is expected that, although the high-definition television system will gain in popularity in the future, it will coexist with the current image signal systems such as the NTSC system and the like for a considerably long period. In accordance with the present invention, it is possible to effectively solve economical problems which will be experienced with image equipment or image transmission paths during the period of coexistence of image signal systems based on different standards.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. In an image transmission device arranged to compress an image signal having a luminance component and a chrominance component and having a predetermined signal band by using band compression means which includes an off-set sub-sampling circuit and to transmit the compressed image signal, the improvement comprising an arrangement for approximately adapting a transmission band of another image signal having another luminance component and another chrominance component and having a signal band narrower than that of said image signal to the transmission band of said image signal and for selectively supplying one of said image signal and said other image signal to said band compression means in which the luminance component and the chrominance signal of said image signal and the luminance signal and the chrominance signal of said another image signal are subjected to time-sharing multiplexing, respectively, and the multiplexing position of the luminance component and the chrominance signal of said image signal and the multiplexing position of the luminance component and the chrominance signal of said another image signal substantially correspond to each other.

2. An image transmission device according to claim 1, wherein said band compression means further includes:
  (a) an inter-field prefilter having a field memory;
  (b) an intra-field prefilter having a line memory;
  (c) a motion detecting circuit for detecting the motion of each pixel in an image signal; and
  (d) a mixer for mixing an output of said inter-field prefilter and an output of said intra-field prefilter in accordance with a detection output of said motion detecting circuit.

3. An image transmission device according to claim 2, wherein said band compression means further includes a motion vector detecting circuit for detecting the motion of an image in said image signal.

4. An image transmission device according to claim 3, wherein said band compression means further includes multiplexing means for multiplexing an output of said mixer with a detection output of said motion vector detecting circuit.

5. An image transmission device according to claim 1, wherein said image signal includes a high-definition television signal having a signal band of approximately 20 MHz, and said other image signal includes an NTSC television signal having a signal band of approximately 4.2 MHz.

6. An image transmission device according to claim 5, wherein said other image signal is a four-channel signal.

7. An image transmission device according to claim 1, wherein said image signal and said other image signal each include a digital signal.

8. An image transmission device according to claim 1, wherein a plurality of said other image signals are subjected to time-division multiplexing.

9. An image transmission device according to claim 8, wherein the pixel arrangements of respective components in said time-division multiplexed image signals are approximately equal to the pixel arrangements of respective components in said image signal.

10. An image transmission device according to claim 9, wherein each of said components further includes a synchronizing signal.

11. An image transmission device comprising:
  (a) band compression means for receiving a signal, compressing the band of said signal, and outputting said band-compressed signal;
  (b) time-axis compressing means for compressing an image signal having a predetermined signal band along a time axis thereof;
  (c) synthesizing means for synthesizing a plurality of other image signals having a signal band narrower that that of said image signal and for approximately adapting a transmission band of said other image signals to the transmission band of said image signal; and (d) selecting means for selectively supplying one of said synthesized image signals output from said synthesizing means and said image signal to said band compression means.

12. An image transmission device according to claim 11, wherein said synthesizing means includes signal-forming means corresponding to said respective other image signals and multiplexing means for effecting time-division multiplexing of outputs of said respective signal-forming means.

13. An image transmission device according to claim 12, wherein said signal-forming means each include:

(a) an A/D converter for digitizing said supplied other image signal;

(b) demultiplexing means for separating said other image signal into a chrominance component and a luminance component; and (c) memory means for storing said separated chrominance component and luminance component and for outputting said respective components at predetermined timings.

14. An image transmission device according to claim 13, wherein said memory means is an FIFO (first-in/first-out) memory.

15. An image transmission receiving device comprising:

(a) band expansion means for receiving an input signal, expanding the band of said input signal, and outputting an image signal having a predetermined band;

(b) time-axis expansion means for expanding an output of said band expansion means along a time axis thereof;

(c) signal separating means for separating from the output of said band expansion means another image signal having a signal band narrower than that of said output; and (d) selecting means for selectively supplying the output of said band expansion means to one of said time-axis expansion means and said signal separating means.

16. An image transmission receiving device according to claim 15, wherein said band expansion means includes an interpolation circuit.

17. An image transmission receiving device according to claim 15, wherein said image signal includes a high-definition television signal having a signal band of approximately 20 MHz, and said other image signal includes an NTSC television signal having a signal band of approximately 4.2 MHz.

18. An image transmission device according to claim 15, wherein said other image signal is a four-channel signal.

19. An image transmission receiving device according to claim 15, wherein said input signal is a digital signal.

20. An image transmission receiving device according to claim 15, wherein said input signal includes a plurality of other image signals subjected to time-division multiplexing.

21. An image transmission receiving device according to claim 15 or 20, wherein said input signal includes said other image signals for four channels.

22. An image transmission receiving device according to claim 15, wherein said signal separating means includes:

(a) dividing means for dividing the output signal of said band expansion means into a plurality of signals having a signal band narrower than that of said output signal; and (b) converting means for converting said respective divided signals into corresponding image signals based on a predetermined standard.

23. An image transmission receiving device according to claim 22, wherein said signals to be supplied to said conversion means are a digital chrominance signal and a digital luminance signal, said conversion means including memory means for storing said respective supplied signals, an encoder for converting said respective signals into an image signal based on a predetermined standard, and a D/A converter for converting into an analog signal said image signal converted by said encoder.

24. An image transmission receiving device according to claim 22 or 23, wherein said predetermined standard is the NTSC standard.

25. In an image transmission device arranged to separate an image signal having a predetermined signal band into a luminance component and a chrominance component, to effect time-division multiplexing of said components, and to supply the time-division multiplexed signal to a signal transmission channel, the improvement comprising an arrangement for separating each of other image signals having a signal band narrower than that of said image signal into a luminance component and a chrominance component, effecting time-division multiplexing of said components, causing the multiplexing position, relative to a predetermined reference signal, of said chrominance and luminance components of each of said other image signals to approximately coincide with the multiplexing position, relative to said reference signal, of the chrominance and luminance components of said image signal, and selectively supplying to said transmission channel one of a multiplexed signal of said other image signal and a multiplexed signal of said image signal.

26. An image transmission device according to claim 25, wherein a blank is disposed between said time-division multiplexed other image signals and/or between said chrominance component and said luminance component.

27. An image transmission device according to claim 25, wherein said reference signal includes a horizontal synchronizing signal.

28. A signal transmission device comprising:

(a) first input means for inputting a first image signal including a luminance component and a chrominance component and having a first band;

(b) second input means for inputting a plurality of second image signals including a luminance component and a chrominance component and having a second band, said second band being narrower than said first band; and (c) means for effecting time-sharing multiplexing of the luminance signal and the chrominance signal of said first image signal on the basis of a predetermined reference signal, said means being arranged to effect time-sharing multiplexing of said plurality of second image signals on the basis of said reference signal.

29. A device according to claim 28, wherein said reference signal includes a horizontal synchronizing signal in said first image signal.

30. A device according to claim 28, wherein said first image signal includes a HD (High Definition) signal.

31. A device according to claim 28, wherein said second image signal includes a NTSC signal having a band of the order of 4.2 MHz.

32. A signal transmission device, comprising:

(a) first input means for inputting a first signal, said first signal including a luminance component signal and a color component signal;

(b) second input means for inputting a plurality of second signals, said second signals each having a narrower band than said first signal; and (c) means for effecting time-sharing multiplexing of the luminance component signal and the color component signal of said first signal on the basis of a predetermined reference signal, said means being arranged to effect time-sharing multiplexing of said plurality of second signals on the basis of said reference signal.

33. A device according to claim 32, wherein said reference signal includes a horizontal synchronizing signal in said first image signal.

34. A device according to claim 32, wherein said first signal includes an HD (High Definition) image signal.

35. A device according to claim 32, wherein said second signal includes an NTSC image signal having a band of the order of 4.2 MHz.

* * * * *

UNITED STATES PATENT AND TRADEMARK OFFICE
CERTIFICATE OF CORRECTION

PATENT NO. : 5,459,523
DATED : October 17, 1995
INVENTOR(S) : Yasuyuki Tanaka

It is certified that error appears in the above-indentified patent and that said Letters Patent is hereby corrected as shown below:

Col. 4, line 62, after "117" insert -- . --.

Col. 8, line 53, change "that" to -- than --.

Col. 10, line 52, change "a" to -- an --.

Col. 10, line 54, change "a" to -- an --.

Signed and Sealed this

Eighteenth Day of June, 1996

*Attest:*

BRUCE LEHMAN

*Attesting Officer*  *Commissioner of Patents and Trademarks*